United States Patent [19]
Weston

[11] 3,742,780
[45] July 3, 1973

[54] CAM FOLLOWER ARRANGEMENT
[75] Inventor: Paul Weston, Solihull, England
[73] Assignee: Joseph Lucas (Industries) Limited, Birmingham, England
[22] Filed: Aug. 23, 1971
[21] Appl. No.: 174,115

[30] Foreign Application Priority Data
Aug. 21, 1970 Great Britain.................. 40,276/70

[52] U.S. Cl.......... 74/568 R, 74/569, 123/140 MC, 123/140 MP
[51] Int. Cl............................................ F16h 53/00
[58] Field of Search............. 74/569, 568 R, 110; 222/250; 123/140 MP, 140 MC, 140 CC

[56] References Cited
UNITED STATES PATENTS
2,569,707  10/1951  Cardell............................ 74/110 X
1,753,020  4/1930  Pielstick........................... 74/569 X
3,452,729  7/1969  Goddard et al................... 74/110 X
2,891,701  6/1959  Downing et al.................. 222/250

Primary Examiner—Charles J. Myhre
Assistant Examiner—F. D. Shoemaker
Attorney—Holman & Stern

[57] ABSTRACT

A cam follower arrangement for use with an edge cam has a plunger slidable towards and away from the cam edge and a pair of rollers in mutual contact and respectively abutting the cam edge and the plunger end. The rollers are mounted in a support which is itself movable in the plane of the cam edge transversely of the direction of movement of the plunger. The plunger position depends on the angle of the cam and the position of the support, and there is a minimum of rubbing friction between the parts.

3 Claims, 3 Drawing Figures

PATENTED JUL 3 1973 3,742,780

INVENTOR
Paul Weston

CAM FOLLOWER ARRANGEMENT

This invention relates to cam follower arrangements and has as an object to provide such an arrangement in a convenient form.

It is known to provide, in association with a movable cam, a cam follower arrangement comprising a plurality of parts, one of which parts can be moved relative to the cam and to another of the parts so as to displace the other of the parts by an amount dependent both on the position of the said one part and on the position of the cam.

According to the invention a cam follower arrangement for use with an edge cam comprises a plunger mounted for reciprocatory movement in the plane of the cam edge and having a face directed towards the said edge, a support movable in the plane of the cam edge transverse to the axis of movement of the plunger, a pair of rollers having parallel axes, and carried by the support the rollers respectively abutting the cam edge and the said plunger face and means for biasing the plunger and cam towards one another so that the rollers are in mutual rolling engagement.

Figure 1:
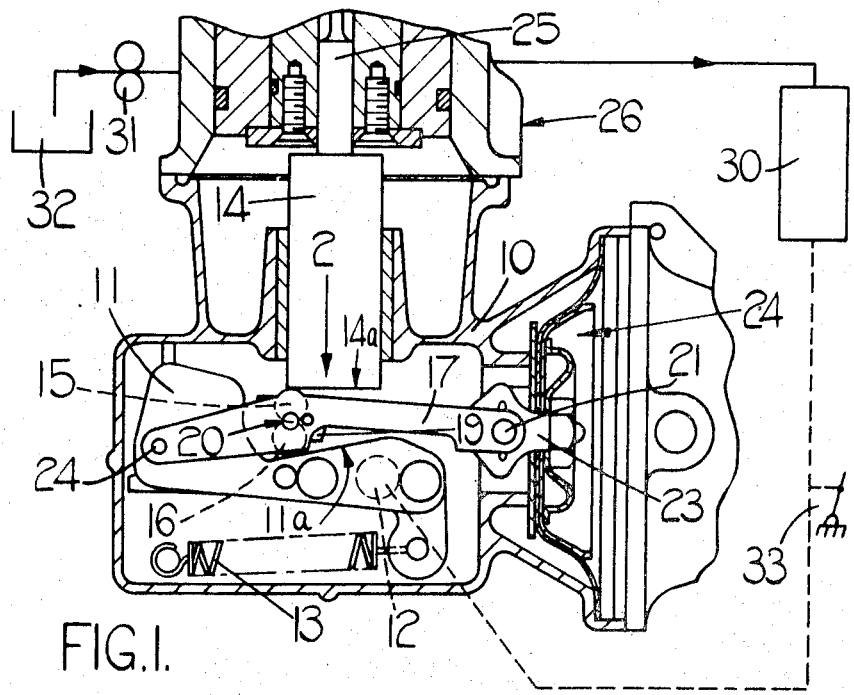
Figure 2:
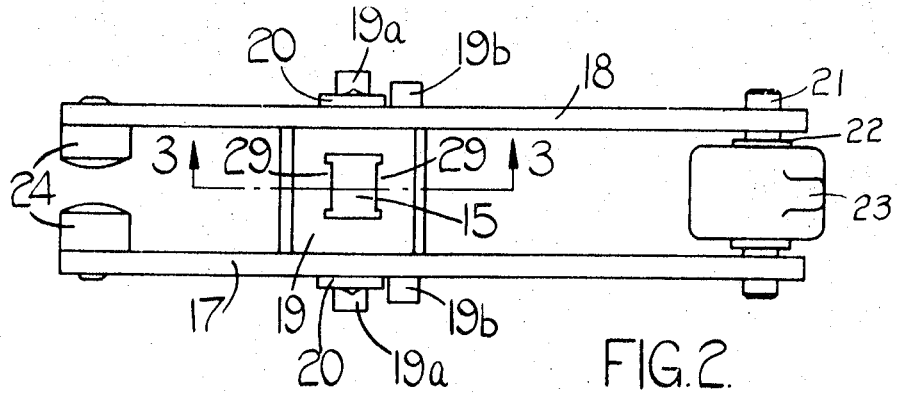
Figure 3:
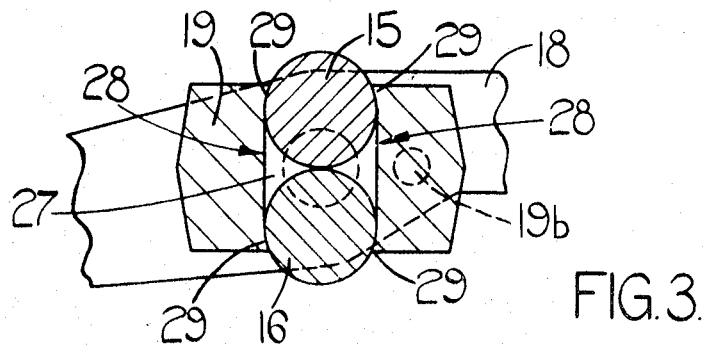

A cam follower arrangement according to the invention will now be described by way of example with reference to the accompanying drawings in which:

FIG. 1 is a section through a fuel control apparatus incorporating an arrangement according to the invention, FIG. 2 shows, to an enlarged scale, a part of the arrangement as viewed in the direction of arrow 2, in FIG. 1, and FIG. 3 is a section, to a still larger scale, on line 3—3 in FIG. 2.

The fuel control apparatus shown in FIG. 1 includes a housing 10 within which a cam 11 is rotatable about an axis 12. Cam 11 is biased in a clockwise direction, as shown in the drawing, by a spring 13. A follower arrangement for the cam 11 comprises a plunger 14 slidable within the housing 10 along an axis normal to the axis 12. Plunger 14 has a face 14a directed towards the cam 11.

A pair of rollers 15, 16 are supported between a pair of arms 17, 18 and respectively engage the face 14a and an edge 11a of the cam 11. The rollers 15, 16 are supported in a resiliently deformable moulded plastics cage 19 having projections 19a which extend through the arms 17, 18 and are engaged by spring clips 20. Cage 19 also has projections 19b which extend through holes in arms 17, 18 to prevent rotation of cage 19 relative to arms 17, 18. Cage 19 has a generally rectangular through passage 27 within which rollers 15, 16 lie. The faces 28 of passage 27 which engage the circumference of rollers 15, 16 are formed at their outer ends with radii which define pairs of inwardly directed lips 29. Lips 29 retain rollers 15, 16 within cage 18 when the rollers are out of engagement with face 14a and edge 11a. Rollers 15, 16 are pressed into passage 27, being retained by the snap action of lips 29.

The arms 17, 18 are pivoted about a pin 21 which extends through a ball 22 mounted in a socket 23. Socket 23 is secured to a diaphragm assembly 24, which is responsive to the manifold depression of an associated internal combustion engine 30. The arms 17, 18 carry nylon studs 24, which engage opposite sides of the cam 11 to steady the arms 17, 18. Plunger 14 abuts an axially aligned control stop 25 forming part of a shuttle-type fuel metering apparatus 26 of a known type and which controls delivery of fuel by a pump 31 from a tank 32 to engine 30.

In use stop 25 is biased towards cam 11 by the pressure in apparatus 26. Cam 11 is rotated about pivot 12 in response to an engine operating parameter, as for example, temperature. Choke control or the position of a throttle 33. The position of the control stop 25 is thus dependent on this parameter and on the engine manifold depression. Movement of the arms 17, 18 relative both to the cam 11 and the plunger 14 causes rollers 15, 16 to rotate in opposite directions and to roll freely. The length of the passage 27 is, such that when the rollers 15, 16 are in mutual engagement under the influence of the spring 13 and a fuel pressure applied to the control stop 25, the rollers do not engage the lips 29. Scuffing and friction between the rollers 15, 16 and the associated parts is thus substantially reduced.

I claim:

1. A cam follower arrangement for use with an edge cam, comprising a plunger mounted for reciprocatory movement in the plane of the edge cam and having a face directed towards said edge, an element movable transversely of the direction of movement of said plunger and a pair of arms pivotally mounted on said element, a cage supported between said arms and movable on movement of said element and on pivotal movement of said arms in the plane of the cam edge, a pair of rollers having parallel axes carried by said cage and respectively abutting the cam edge and the plunger face and means biasing the plunger and the cam towards one another so that the rollers are interengaged and in mutual rolling engagement.

2. An arrangement as claimed in claim 1 in which the cage is of a resilient material and is provided with projections adapted to engage the rollers by snap action.

3. An arrangement as claimed in claim 1 in which the cage includes projections which extend through appertures in the arms to prevent rotation of the cage with respect to the arms.

* * * * *